United States Patent Office 2,708,630
Patented May 17, 1955

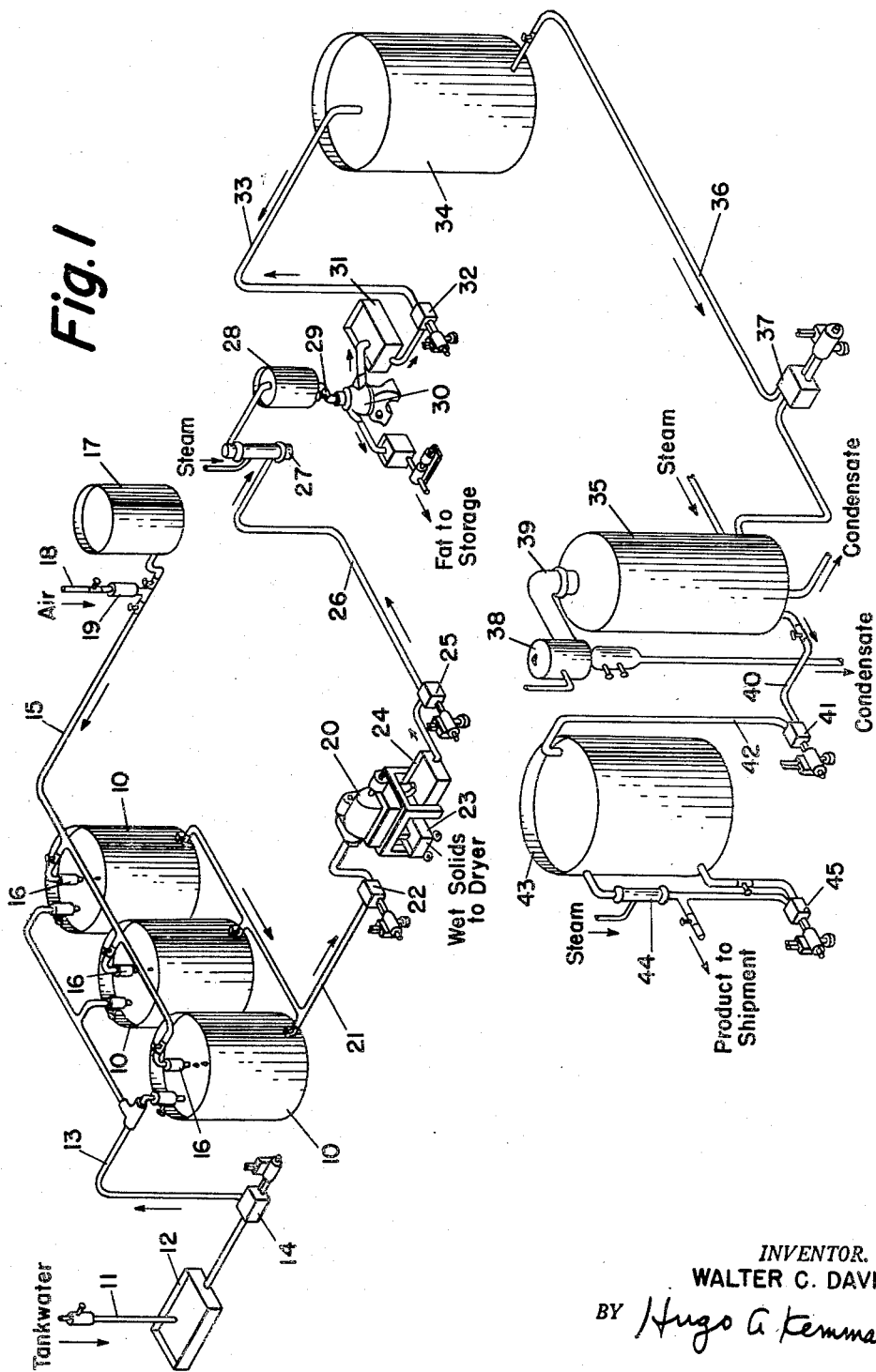

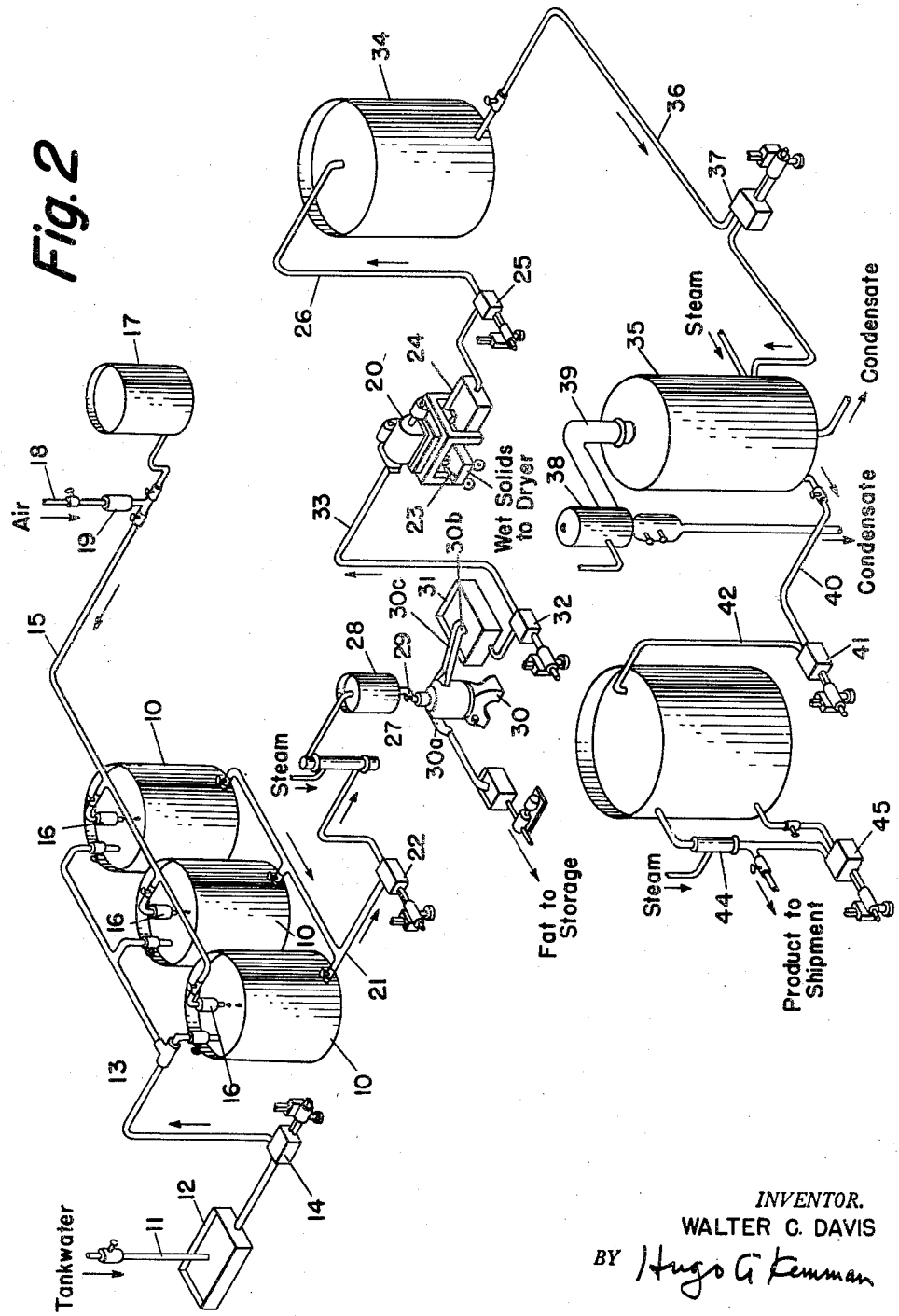

2,708,630

TREATMENT OF PACKING HOUSE TANKWATER

Walter C. Davis, Tredyffrin Township, Chester County, Pa., assignor to The Sharples Corporation, a corporation of Delaware Application April 2, 1951, Serial No. 218,752

9 Claims. (Cl. 99—7)

This invention relates to the treatment of tankwater, produced as by-product in the wet rendering of animal fats and other packing house by-products, and relates more particularly to a process for the treatment of such liquid to increase the value of the products obtained therefrom.

In the meat packing industry, only a portion of the animal can be sold as prime edible products. It is an economic necessity to recover values from the balance of the animal and this is done by rendering to recover fats, which may be used for the manufacture of lard or in soap manufacture, and to recover meat meal, which is used for animal feed. Such recovery is done by either the dry rendering or the wet rendering process. In the latter system a tank is charged with the material to be rendered, which may consist of portions of fat, meat scraps, bones, and even whole condemned animals. Live steam is turned into the tank under a pressure of, for example, approximately 65 lbs. per sq. inch, and the mass is cooked in this manner for several hours. The pressure is then gradually released over a period of time long enough so that boiling does not take place, and the contents of the tank are allowed to settle. After settling, the fat is drawn off from the top by decantation and skimming, the water is drained off, and the solids removed from the bottom of the tank, subjected to hydraulic pressing and heat drying to remove excess moisture and then are sold as animal feed. The water drawn off from the tank, together with the water squeezed out of the solids by pressing, is known as tankwater. Although this contains a certain amount of fat and protein, in some cases it is thrown away. In others, it is evaporated to 60 to 65% solid content, and this product is then called "stick liquor" or merely "stick." The stick liquor is added to metal for protein fortification, or sold separately to the feed industry for use as a feed supplement. After evaporation to say 60% total solids, the content of the stick water is approximately 6% to 9% insoluble solids, 48 to 51% soluble solids, and 1½ to 3% fat. On a dry basis the concentrate contains an average of 65 to 75% protein.

In the above described conventional method it is well-known that there is a considerable loss of protein during the period in which tankwater is stored before being delivered to the evaporator, and in the evaporation step itself. It is also true that the final meat solubles (stick liquor) tend to decompose in storage and develop a putrid odor.

I have discovered a method by which tankwater can be treated so that the evaporated product will be high in protein, will show stability in storage, will lack the putrid odor and will have uniform consistency, making it more easy to handle. In addition, extra fat is recoverable, and extra meat solids, and evaporator efficiency is increased as the result.

I have found that by the addition of an acidic material to tankwater in sufficient amount to reduce the pH of said tankwater to a value within the range of about 4 to 5, and preferably 4.3 to 4.6 while the temperature of the tankwater is maintained at at least 180° F. and preferably above 185° F. and below boiling, the suspended solid and fatty materials are caused to separate from suspension. The separated solids coagulate or agglomerate, and tend to settle, while the separated fat tends to float to the surface. At the same time a portion of the dissolved proteinaceous material is thus caused to separate from solution. This separated proteinaceous material coagulates or agglomerates, and tends to settle. As a result decomposition of proteins and amino acids, both in the tankwater and in the coagulated or agglomerated solidls, is very materially reduced or prevented.

After causing the coagulation or agglomeration of the separated solid proteinaceous material in the acidified tankwater to go to substantial completion, and causing at least a substantial part of the proteinaceous material, and particularly that remaining in the tankwater, to hydrolyze, the acidified mixture is passed to and through a centrifuge, or any other suitable device adapted to separate and remove solids and/or fat from the acidified tankwater. Depending upon the separating device, this may accomplish both the separation of released fat and of solids. However, I prefer to separate the fat from the treated tankwater, either before or after separation of the solids. The individual separation of solids and fat permits the use of centrifuges individually adapted to the efficient separation of either solids or fat as the case may be, though some of the other of the two may be separated as a separate phase in the same operation.

I have discovered that tankwater so processed, and which is now substantially free of suspended solids and fat, is stable against putrefaction. I have also found by this method there is a negligible loss of metabolizable nitrogen (that which is available for nutrition) whereas, in the usual method, without acidification, much of the metabolizable nitrogen breaks down into ammoniacal nitrogen, which is lost during evaporation. Without acidification, it is not unusual for 35% of the total nitrogen to become unavailable for feeding in three days' time.

Considering the process in greater detail, the animal fats and other packing house by-products are wet-rendered by conventional methods well-known to the art, to produce a hot mixture of undissolved solids, fats, and water containing suspended and dissolved material. This hot mixture is usually passed through a screen or centrifuge before it is collected in a settling tank for subsequent processing to remove undissolved solids and fat by well-known, conventional methods.

The hot tankwater, after the removal of readily separated undissolved solids and fat, is still at an elevated temperature, for example, about 210° F. or above, and usually still contains appreciable quantities of fat which may be removed by additional settling at this elevated temperature. The fat rises to the surface of the liquor in the settling tank and may be withdrawn by skimming. Alternately, the hot tankwater may be passed through a centrifuge adapted to separate fat from the aqueous phase, but irrespective of the method employed for the initial separation of solids and fat from the tankwater, it is now ready for processing in accordance with this invention.

Referring to Figure 1 of the schematic drawing, the hot tankwater is now transferred to one of a plurality of acidulation tanks 10 through conduit 11, catch tank 12, and conduit 13 by means of pump 14. The required amount of acidic treating agent, such as sulfuric acid, for example, is fed continuously into admixture with the incoming stream of tankwater as the tank 10 is being filled, through valved conduit 15 and at drip tank 16, from treating agent storage tank 17. This is accomplished by applying air pressure through valved conduit 18 to treating agent measuring tank 19, after charging tank 19 with a measured amount of treating agent. The treating agent is preferably introduced into the tankwater in the acidulation tank at a slow, steady rate to avoid any local over-acidulation which might tend to injure the color of the subsequently removed fat. Sufficient treating agent is added to the tankwater to reduce the pH thereof down to between 4 and 5, and preferably down to between 4.3 and 4.6.

After the acidulation tank 10 is filled, and the pH is properly adjusted, the tank 10 is maintained substantially static at a minimum temperature of 180° F. for at least approximately fifteen minutes, such as, for example, thirty minutes to permit coagulation or agglomeration of suspended colloidal proteins, and of proteinaceous enzymes thus thrown out of solution in the tankwater, as well as to cause, due to the particularly described temperature and pH conditions applied, substantial hydrolysis of protein material present, particularly in the tankwater. (During this period the material in one or more of the other tanks 10 is placed on stream for further processing as hereinafter described, and at the end of such processing the tank is recharged with untreated tankwater and treating agent as described above.) The maintenance of the elevated temperature and reduced pH conditions described prevents proteolysis of the enzymes, and causes the desired chemical and physical changes which lead to a treated tankwater, which upon being subjected to evaporation, yields a highly valuable concentrated product to be hereinafter more particularly described.

The proteins thus coagulated or agglomerated have been found to be the ones which start or promote decomposition of the tankwater. By adjustment of pH and temperature as above described, these objectionable proteins, including proteinaceous enzymes originally in solution in the tankwater, are coagulated or agglomerated, and further enzymolysis of proteins present, in either the liquid or solid phase, is immediately arrested or inhibited. The proteins remaining in solution are recovered as condensed solubles, as will be described below. At this point, dissolved proteins represent, for example, about 8 per cent by weight of the tankwater.

Although I prefer to use sulfuric acid as the treating agent, I can use other chemicals adapted to reduce the pH of the tankwater down to from 4 to 5, such as aluminum sulfate, any of the alums, ferric chloride, tannic acid, etc. In general, substances of definitely acidic nature are suitable reagents for this step.

The necessary amount of treating agent is added to obtain the desired pH. When using aluminum sulfate, for example, usually from one-quarter of one per cent to one per cent will suffice. The pH of the tankwater is a useful criterion in determining when sufficient sulfuric acid, aluminum sulfate or other treating agent has been added. The original pH of the tankwater is usually about 5.6 to 6.5. The untreated tankwater usually comprises a slightly acidic aqueous mixture containing suspended fat of lower density than the water phase, and suspended proteinaceous material of slightly greater density than the water phase. The droplets of suspended fat in the original tankwater are evidently stabilized, or tightly adsorbed on colloidal proteinaceous material to such an extent that they are not separated from the liquor by settling, or even by centrifuging. As a result of my treatment of the tankwater, the fat is freed, and colloidal proteinaceous material is coagulated or agglomerated.

The fat liberated in the treated tankwater by the action of the treating agent under the conditions described is susceptible to various separatory operations, such as settling or centrifuging. The coagulated or agglomerated proteins may also be removed by centrifuging or settling at the same time that the fat is removed, provided equipment adapted to efficiently separate heavy, intermediate, and light density materials as three separate phases is employed. However, I prefer to first remove either the fat or the coagulated or agglomerated proteins, the latter together with any previously incompletely separated meal.

Referring again to Figure 1 of the drawings, initial removal of solids is illustrated as accomplished by passing the hot mixture from the acidulation tank 10 into a continuous sludge discharge, horizontal-type, clarifying centrifuge 20 at a controlled rate, by means of conduit 21 and pump 22. The solids are continuously separated in centrifuge 20 and are discharged into a cart 23. Usually, these solids are then passed through a dryer (not shown). The resulting dried solids, usually analyzed from 65 per cent to 75 per cent protein, depending upon the raw material originally used.

Although limited amounts of solids, for example, from 2 to 3 per cent of the tankwater treated, are recovered in this step, removal of these solids under the conditions of treatment described is vitally important because such removal increases greatly the value of the final condensed soluble material to be described hereinafter.

If these solids are not caused to separate under the conditions of treatment from the tankwater, their presence in whole or in substantial part in the final concentrated stickwater imparts to it a strong undesirable odor, and makes the condensed tankwater susceptible to decomposition. Furthermore, removal of these solids prior to evaporation greatly increases the operating efficiency of the evaporators in the evaporation stage which is to be described below. If these solids, or any substantial part thereof, remain in the feed to the evaporators, not only is the final product so highly viscous that it cannot be handled as a liquid, but also serious incrustation of the evaporator tubes takes place in a matter of hours. With these solids removed under the conditions of treatment described, the concentrated product can be handled as a liquid, and the evaporators can be operated without loss in operating efficiency for a period of thirty days or more before cleaning becomes necessary.

Also of outstanding importance is the fact that, by the practice of my invention, the final concentrated product is obtained in a stable form having a smooth texture, and which does not separate into layers on standing. This not only avoids the necessity of remixing prior to use, but also shows substantial hydrolysis of the proteins present. Since hydrolyzed protein is much more easily digestible, the result is that a highly nutritive product is obtained. Under the conditions of treatment, the residual fat in the final concentrated product is very considerably reduced, and is well below that quantity which would be harmful if present in products used as feed. Moreover, and as pointed out above, the final concentrated product is unusually stable against bacterial decomposition, and is not of such high viscosity that it cannot be handled as a liquid, particularly upon slight warming.

Returning again to Figure 1 of the drawings, the liquid component of the acidulated mixture is discharged from centrifuge 20 into catch tank 24, and is transferred by means of pump 25 through conduit 26 and heater 27 into feed tank 28. In passing through heater 27 and into feed tank 28, the temperature of the tankwater is preferably raised above 200° F., such as, to about 210° F. in order to reduce the viscosity of the fat and make easier the separation of the aqueous phase and the small amount of very fine residual solids usually present. The hot tankwater is then fed, at a controlled rate, through valved conduit 29, to a centrifuge 30 which is adapted to skim or remove a lower density liquid from a higher density liquid. In centrifuge 30, the lower density fat is separated from the higher density aqueous portion of the charge liquid, and is transferred to a fat storage tank (not shown). For the purpose of making this separation, I prefer to use a continuous, three phase nozzle-discharge type centrifuge, residual solids and part of the tankwater comprising the third phase. This assists in clarifying the fat of very fine insoluble solid residue usually present in the tankwater.

The amount of fat recovered at this stage depends upon the efficiency of the primary separation of fat from the tankwater. Generally speaking, all fat in excess of about 0.10 per cent in the feed to centrifuge 30 is recovered at this point. This usually amounts to about a 5 to 10 per cent overall increase in the amount of fat recovered from the tankwater.

If the fat is not removed, it will contaminate the final condensed solubles product with reduction in its quality because fat reduces the nutritional value of the condensed solubles. Furthermore, the presence of excess fat in the charge solution to the evaporator leads to reduction in thermal efficiency. There is a tendency for the fat to adhere to the evaporator tubes and to form incrustations on the tubes in combination with the small amount of very fine insoluble residues usually remaining in the tankwater charged.

The tankwater discharged from centrifuge 30 displays substantially no tendency toward enzymolysis or putrefaction. If the tankwater is discharged in more than one stream, the streams are usually combined for further processing, it being unnecessary to remove the small amount of very fine insoluble residue present, in view of the low fat content of the tankwater. The acidulated tankwater at this point usually contains around approximately 10 per cent of total solids, composed of .3 to .5 percent insoluble solids, the balance soluble solids, and .10 per cent or less of fat.

The acidulated tankwater is now in proper condition for concentration, and is preferably evaporated in a suitable apparatus, such as a forced circulation vertical tube type evaporator. The tankwater discharged from centrifuge 30 into catch tank 31, is transferred by means of pump 32 through conduit 33 into acidulated tankwater storage tank 34. From tank 34 the acidulated tankwater is charged to evaporator 35 through valved conduit 36 by means of pump 37. The pressure in the evaporator 35 is reduced by means of barometric condenser 38, and evaporation is carried out to the desired degree by drawing off water vapor through conduit 39. The concentrated product is withdrawn from evaporator 35 through valved conduit 40, and is transferred by means of pump 41 and conduit 42 to condensed product storage tank 43. Tank 43 is provided with a heater 44 and a pump 45 for circulation and warming of the condensed product in tank 43, particularly in cold weather, to lower its viscosity, thus maintaining it in readily flowable condition.

The degree of evaporation effected usually depends upon the use to which the condensed product is to be put, and upon its particular flow characteristics which may vary somewhat with different tankwater. In general, the tankwater is evaporated to a total solids content of about 50–60 per cent, but by the use of this method herein described it is possible to concentrate up to 70 per cent or possibly higher total solids because of the reduction of grease and insolubles in the tankwater produced by acidulation followed by centrifuging.

In Figure 2 of the drawings, wherein like parts bear like reference numerals, removal of fat prior to the removal of solids is illustrated. The essential difference between Figure 2 and Figure 1 of the drawings is that in Figure 2 the positions of centrifuges 20 and 30 together with their appurtenances have been interchanged.

Thus in Figure 2 pump 22 feeds through heater 27 into feed tank 28 for centrifuge 30. In passing through heater 27, the temperature of the tankwater is raised, if not already of a desired temperature, such as to above 200° F., in order to reduce the viscosity of the fat and facilitate separation thereof from the aqueous phase, and the coagulated or agglomerated solids present. In this operation a continuous three phase nozzle-discharge type centrifuge is very useful.

As illustrated, fat is discharged from centrifuge 30 at 30a, tankwater at 30b and solids with tankwater at 30c. Substantially the same efficiency in fat separation is obtained as in Figure 1.

Although the two tankwater-containing streams may be processed separately, if desired (and the same applies in Figure 1), I usually prefer, particularly when employing a nozzle-discharge type centrifuge, to combine them in catch tank 31, from which the combined streams are pumped through conduit 33 by pump 32 into centrifuge 20.

In centrifuge 20, solids are separated from the tankwater in the same manner as previously described in connection with Figure 1, and the tankwater is fed into tank 34 by pump 25 through conduit 26, for further processing in the same manner as already described in connection with Figure 1.

In view of the heat supplied at 27, it is rarely necessary to reheat the tankwater-solids mixture fed to centrifuge 20 from catch tank 31 to maintain it at a temperature above 180° C. However, heating may be resorted to if necessary or desirable.

The products obtained in Figure 2 are of the same quality as those obtained in Figure 1.

Without acidification, tankwater normally has a pH of somewhere in the range of 5.6 to 6.5, and this pH steadily rises as time goes on. After acidification to a pH of say 4.5, the tankwater will remain without any material increase in pH over much longer periods of time, more than adequate to obtain the benefits of the further processing as herein described. On the untreated tankwater, there is a steady loss of nitrogen as the pH increases, whereas such a loss of nitrogen does not occur when the pH is held within the ranges described herein. This is extremely important inasmuch as "stick" is sold on a nitrogen analysis basis.

Even more important is the fact that as time goes on, there is a breaking down of metabolizable nitrogen (that which is available for nutrition into ammoniacal nitrogen when the pH of the tankwater is what is normally encountered in untreated tankwater. The ammoniacal nitrogen is lost during evaporation, thus materially reducing the sales value of the product and its usefulness as a feed supplement. After the tankwater is acid treated, there is practically no change from metabolizable nitrogen to ammoniacal nitrogen and, therefore, no loss during evaporation, thus materially enhancing the value of the product.

The treated tankwater does not give off the offensive odors which are commonly found with unacidified tankwater. This creates a marked improvement in working conditions in the tank house.

While in the foregoing particular description reference has been made to certain types of centrifuges for making the desired separations referred to, it is to be understood that any other type or types of centrifuges suitable for the purpose, or other suitable separation devices, may be employed.

Continuous sludge discharge, horizontal-type, clarifying centrifuges, particularly referred to above, are well-known in the art, for instance see Figure 5 in an article by Mr. C. M. Ambler, entitled "New developments in centrifuge applications," appearing in "Chemical Engineering Progress" for May 1948, pages 405 to 410. In Figure 3 is shown a continuous three-phase nozzle-discharge type centrifuge, which type of centrifuge also has been particularly referred to above. Other centrifuges referred to in this article might be employed in practicing the invention, for example, the valve discharge centrifuge illustrated in Figure 4. A centrifuge of the latter type is described and claimed in U. S. Patent 2,286,354, by Harold C. Fitzsimmons. A valve discharge centrifuge may be employed for separating solids, tankwater and fat in a single operation, or for the separation of solids from a mixture of tankwater and fat, or from the tankwater after separation of the fat.

Other types of centrifuge construction useful in carrying out the invention will suggest themselves to persons skilled in the art upon becoming familiar with this invention.

In carrying out this invention, it is preferred that the tankwater from the time of its production to the time of its acidulation to reduce its pH to between 4 and 5, be maintained at a temperature above 180° F. This also applies to the static holding period in tank 10, and to the centrifugal separation steps in the latter case to facilitate separation. It is also preferred that tankwater be processed within a short time after its production and initial separation from solids and oil.

It will be understood that the equipment described in connection with the drawings is for purposes of illustration, and that any other suitable equipment may be substituted. For instance, although simple evaporator equipment has been described, it will be understood that any other type may be employed, such as multiple effect evaporating equipment. In connection with the latter, it is sometimes preferred to have the tankwater flow through the evaporating stages in a reverse direction, that is in the direction of increasing temperature, the tankwater being first fed into the stage of lowest temperature.

Other variations will occur to persons skilled in the art upon becoming familiar herewith. Accordingly, it is to be understood that the above particular description is by way of illustration and not of limitation, and that changes, omissions, additions, substitutions and/or modifications may be made without departing from the spirit of the invention. Accordingly, it is intended that the patent shall cover, by suitable expression in the claims, whatever features of patentable novelty reside in the invention.

I claim:

1. A process for treating packing house tankwater which comprises adding to said tankwater an acidic material in amount sufficient to reduce the pH of said tankwater to within the range of from 4 to 5 while maintaining the temperature of said tankwater above 180° F. but below boiling, holding said treated tankwater substantially static for a period of at least 15 minutes, and thereafter separating undissolved solids and liberated fat from said tankwater.

2. The process of claim 1 in which the pH range is from 4.3 to 4.6.

3. The process of claim 1 in which the acidic material is sulfuric acid.

4. The process of claim 2 in which the acidic material is sulfuric acid.

5. The process of claim 1 in which the final treated tankwater is subjected to vacuum evaporation to produce a concentrated product.

6. The process of claim 5 in which the final concentrate has a solids content of between 50 and 70 per cent by weight.

7. The process of claim 1 in which the tankwater from the time of its production through the time of pH adjustment is maintained at a temperature above 180° F.

8. The process of claim 7 in which a temperature above 180° F. is continuously maintained through the separation of solids and fat.

9. The process of claim 1 in which the static holding period is at least approximately 30 minutes.

References Cited in the file of this patent

UNITED STATES PATENTS

| | | |
|---|---|---|
| 2,302,393 | Schopmeyer | Nov. 17, 1942 |
| 2,371,812 | Ernst | Mar. 20, 1945 |
| 2,525,293 | Gillman | Oct. 10, 1950 |
| 2,597,230 | Davis | May 20, 1952 |